(12) United States Patent
Meyrahn et al.

(10) Patent No.: US 8,458,989 B2
(45) Date of Patent: Jun. 11, 2013

(54) CLIP CONTROL SYSTEM

(75) Inventors: Joachim Meyrahn, Frankfurt (DE);
Eggo Haschke, Deerfield, IL (US);
Jürgen Hanten, Frankfurt (DE)

(73) Assignee: Poly-Clip System Corp., Mundelein, IL (US)

( * ) Notice: Subject to any disclaimer, the term of this patent is extended or adjusted under 35 U.S.C. 154(b) by 782 days.

(21) Appl. No.: 11/670,697

(22) Filed: Feb. 2, 2007

(65) Prior Publication Data

US 2007/0180793 A1    Aug. 9, 2007

Related U.S. Application Data

(60) Provisional application No. 60/765,284, filed on Feb. 3, 2006.

(51) Int. Cl.
*B65B 57/00* (2006.01)
*B67B 3/26* (2006.01)

(52) U.S. Cl.
USPC .............................................. 53/75

(58) Field of Classification Search
USPC ....................... 53/52, 75, 583, 505
See application file for complete search history.

(56) References Cited

U.S. PATENT DOCUMENTS 7,325,380 B2 *  2/2008  Ebert ............................ 53/417

* cited by examiner

*Primary Examiner* — M. Alexandra Elve
*Assistant Examiner* — John Paradiso
(74) *Attorney, Agent, or Firm* — Clark Hill PLC

(57) ABSTRACT

A clip control system is described. The invention in a first embodiment is a clip control system comprising a stuffer/clipper comprising a reader and a processing unit and having an operating parameter, a clip package mountable to the stuffer/clipper and holding a plurality of clips, and information encoded in the clip package and readable by the reader, the processing unit configured to receive the information and to set the operating parameter based thereon. The clip package is a reel or a canister. In another embodiment, the invention comprises a clip package holding a plurality of clips and being mountable to a stuffer/clipper having a reader. The clip package has information encoded therein and readable by the reader. In either embodiment, the information is encoded in an RFID tag, a bar code, or a magnetic strip. The reader is a RFID reader, a bar code reader, or a magnetic strip reader. The information is product-specific information and can also include the identity of the clip manufacturer.

8 Claims, 4 Drawing Sheets

CLIP CONTROL SYSTEM

BACKGROUND OF THE INVENTION

This invention relates generally to the production of food products in casings. More specifically, the invention relates to the use of reels of clips on stuffer/clippers.

Products such as dry sausages and cooked sausages are prepared by extruding a pasty mixture of meat, spices, and fillers into a casing. Other prepared meats, such as deli meats and molded products, are manufactured in a similar manner, as are whole-muscle meats. For some applications, a shirred cylindrical casing is used; for other applications, flat sheets of casing are turned over plows and formed into a cylinder. Casings can be plastic, natural, fibrous, collagen, or synthetic. After the product has been wrapped in the casing, a clip is applied at each end to seal the product within the casing. Automatic sealing and clipping machines are well known in the art of food preparation, such as the TSC-N automatic stuffer/clipper sold by Poly-clip System Corp. of Mundelein, Ill. These devices automatically feed clips into the stuffer/clipper.

One type of clip is a so-called "S-clip", having a clip base and two clip legs adjoining the latter on both sides. Metal S-clips are conventionally manufactured from wire and supplied either on a reel or in stick form. A plurality of clips are formed in a line by a vibrator and connected by adhesive tape, glue, or plastic, or other similar methods. A stick is usually about 50 clips long, formed in a straight line. A reel contains thousands of clips, formed in a line and rolled onto the reel. S-clips can also be formed from plastic by injection molding, in which case they are generally molded in sections of 50 or more clips.

Another type of clip is a so-called "R-clip", in which the individual clips are formed in a continuous line and rolled onto a reel. Either type of clip, S or R, can be coated, coded, or colored for different applications.

A modern automated stuffer/clipper can process food products in a variety of ways, depending on the application. Various product-specific specifications and parameters must be entered for each application, including but not limited to clip size, clip type, film type, portions per casing, label, speed control, and casing brake settings. These specifications and parameters can be stored in the memory of the stuffer/clipper and recalled by the operator. Accordingly, a high degree of training and experience is necessary to operate such a machine, to be sure that the correct menu is used and that the correct clips are being applied. The use of the wrong clip can cause serious problems in food production. For example, if the wrong size clip is used to make sausages, the raw sausages may appear to have been manufactured correctly, but the sausage will fall off the tree from which it hangs during a smoking operation, at which point in time it is too late to remedy the situation.

Additionally, different manufacturers make clips to different quality control standards. A manufacturer who wishes to guarantee the performance of its clips would like to know that its own clips are being used, not another manufacturer's clips.

A need exists for a way to operate an automated stuffer/clipper without requiring a great amount of training and experience. A further need exists for a manufacturer to be able to guarantee its own clips but not another manufacturer's clips. The present invention fills these needs.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

BRIEF SUMMARY OF THE PREFERRED EMBODIMENTS OF THE INVENTION

Figure 1:
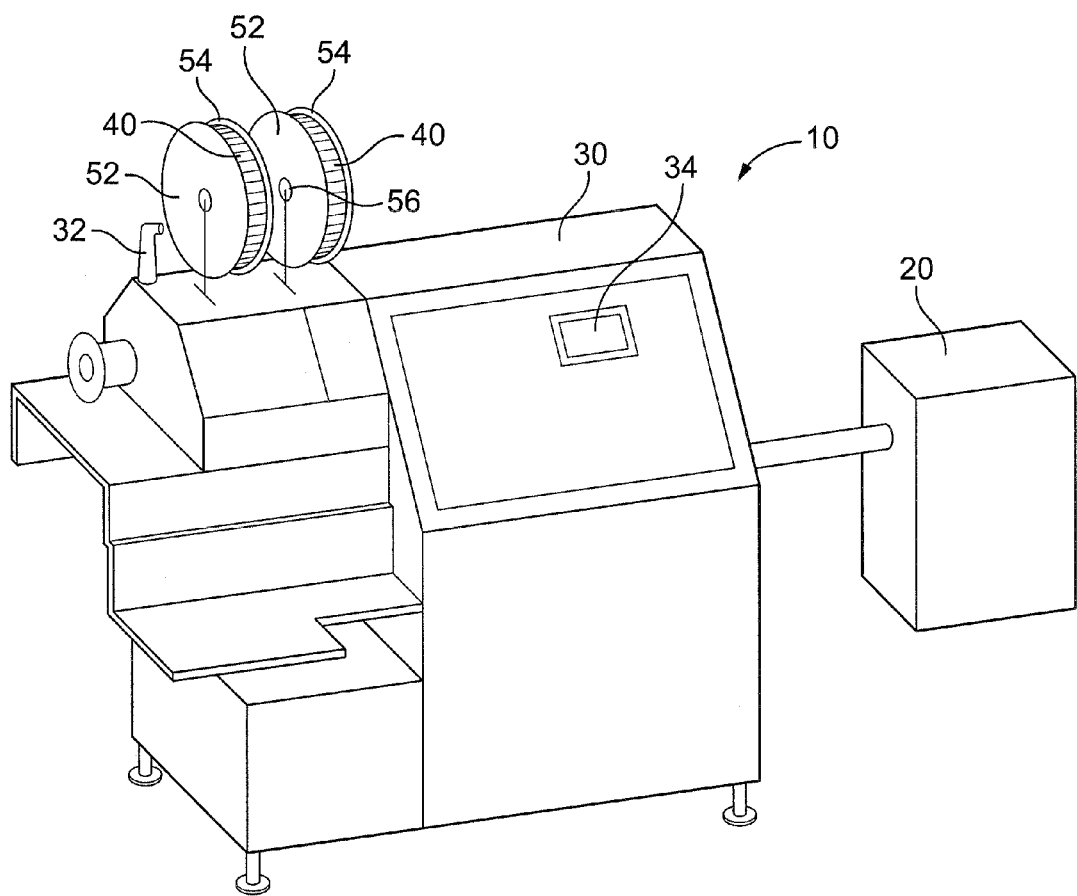
FIG. 1 is a front elevation view of the clip control system of one embodiment of the present invention.

The invention in a first embodiment is a clip control system comprising a stuffer/clipper comprising a reader and a processing unit and having an operating parameter, a clip package mountable to the stuffer/clipper and holding a plurality of clips, and information encoded in the clip package and readable by the reader, the processing unit configured to receive the information and to set the operating parameter based thereon. The clip package is a reel or a canister. In another embodiment, the invention comprises a clip package holding a plurality of clips and being mountable to a stuffer/clipper having a reader. The clip package has information encoded therein and readable by the reader. In either embodiment, the information is encoded in an RFID tag, a bar code, or a magnetic strip. The reader is a RFID reader, a bar code reader, or a magnetic strip reader. The information is product-specific information and can also include the identity of the clip manufacturer.

DETAILED DESCRIPTION OF THE PREFERRED EMBODIMENTS OF THE INVENTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 is a front elevation view of a first embodiment of the clip control system 10 of the present invention. Meat, spices, and fillers are delivered into a mixer 20 and are chopped and mixed to form a pasty mixture. Mixer 20 pumps the pasty mixture into an automated stuffer/clipper 30. Stuffer/clipper is preferably a TSC-N automatic stuffer/clipper sold by Poly-clip System Corp. of Mundelein, Ill. A roll of flat casing film is formed over plows into a tube and an ultrasonic sealer seals the seam of the tube, to form a continuous cylinder of casing. (In another embodiment, tubular casing is used.) The pasty mixture is extruded by the stuffer/clipper 30 into the casings. Voiding gates within the stuffer/clipper 30 grasp the filled casing, form a neck, and apply two clips 40. A knife severs the neck between the two clips 40 to separate the individual sausages.

The clip control system of the present invention provides information about clips 40 in the package in which the clips 40 are supplied from the clip manufacturer. The information is preferably at least clip size but can also include information such as clip type, film type, portions per casing, label, speed control, and casing brake settings. The clip package is preferably a reel or a canister but can be another type of package.

In a first embodiment, a reel of clips is used. Clips 40 are manufactured in a continuous line and are rolled onto a reel 50 in a manner known in the art. Each reel 50 comprises two sidewalls 52, 54, mounted on a central axle 56. Since, in the preferred embodiment, automated stuffer/clipper 30 is a double clipper, two separate reels 50 are mounted. Only one reel 50 is needed for a single-clip application. The clips 40 feed off the reel 50 and onto the clip rail of the stuffer/clipper 30.

Product-specific information, including by way of example and not by way of limitation, clip size, clip type, film type, portions per casing, label, speed control, and casing brake settings, is encoded in one of the sidewalls 52, 54 of the reel 50 of the present invention. Stuffer/clipper 30 uses this information to program itself for the proper operating parameters necessary for that clip 40. Stuffer/clipper 30 also verifies that the proper clips 40 are being used. Accordingly, mistakes in the setting of operating parameters can be minimized, as the operator does not directly enter the parameters. Mistakes resulting from using the wrong clips can also be avoided.

Figure 2A:
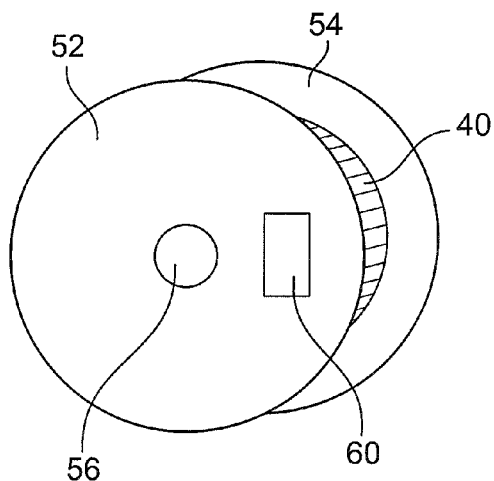
FIGS. 2A, 2B, and 2C are elevation views of reels of clips used in the clip control system of FIG. 1.

In one embodiment, as shown in FIG. 2A, an RFID tag 60 is embedded within one sidewall 52. Tag 60 contains product-specific information for the exact type of food product to be made by the automated stuffer/clipper 30. Tag 60 is a passive RFID tag. As is well known in the art of RFID tags, each tag 60 contains a transponder with a digital memory chip containing a unique electronic code for the food product to which the clips 40 on reel 50 will be applied.

Stuffer/clipper 30 is coupled to a reader 32. In one embodiment, reader 32 is an RFID reader. RFID reader 32 contains, as is well known in the art of RFID tags, an interrogator and an antenna packaged with a transceiver and decoder. When reel 50 with tag 60 is mounted on stuffer/clipper 30, the interrogator of reader 32 emits a signal activating tag 60 in order to read and write data to tag 60. Reader 32 decodes the data encoded in the integrated circuit of tag 60 and the data is passed to the central processing unit 34 of stuffer/clipper 30. Processing unit 34 uses that data, which is preferably product-specific information, to set the various parameters of stuffer/clipper 30.

Figure 2B:
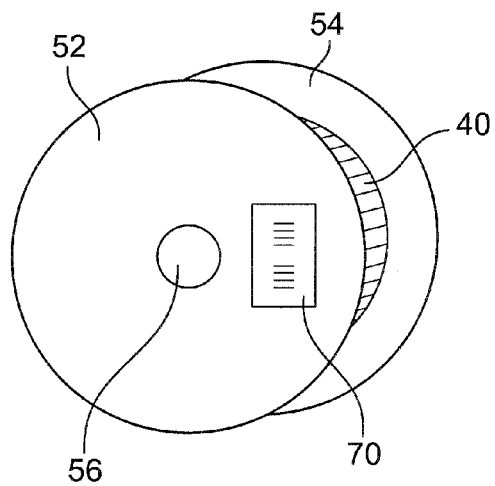
Figure 2C:
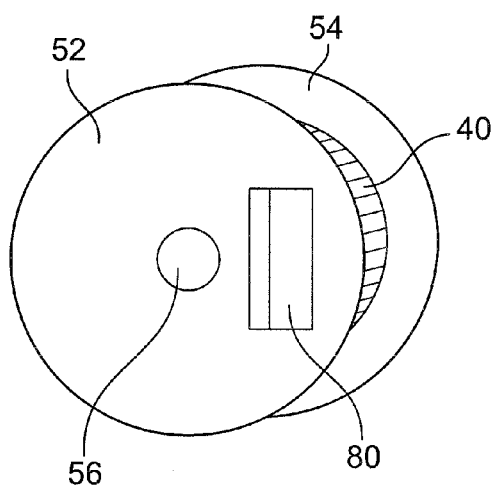

In another embodiment, a bar code 70 is printed or affixed on reel 50, as shown in FIG. 2B. Bar code 70 can contain linear, stacked, or two-dimensional codes. Bar code 70 contains product-specific information for the exact type of product to be made by the automated stuffer/clipper 30. In this embodiment, reader 32 contains an optical scanner that functions as a bar code reader. Before mounting reel 50 onto stuffer/clipper 30, the operator drags sidewall 52, containing bar code 70, across reader 32. Reader 32 reads data encoded in bar code 70. Reader 32 transmits that information to the central processing unit 34 of stuffer/clipper 30. Processing unit 34 uses that data, which is preferably product-specific information, to set the various parameters of stuffer/clipper 30.

In yet another embodiment, a magnetic strip 80 is attached to a sidewall 52 of reel 50. Strip 80 contains product-specific information for the exact type of product to be made by the automated stuffer/clipper 30. In this embodiment, reader 32 is a magnetic reader. Before mounting reel 50 onto stuffer/clipper 30, the operator drags sidewall 52, containing strip 80, across reader 32. Reader 32 reads data encoded in bar code 80. Reader 32 transmits that information to the central processing unit 34 of stuffer/clipper 30. Processing unit 34 uses that data, which is preferably product-specific information, to set the various parameters of stuffer/clipper 30.

Figure 3:
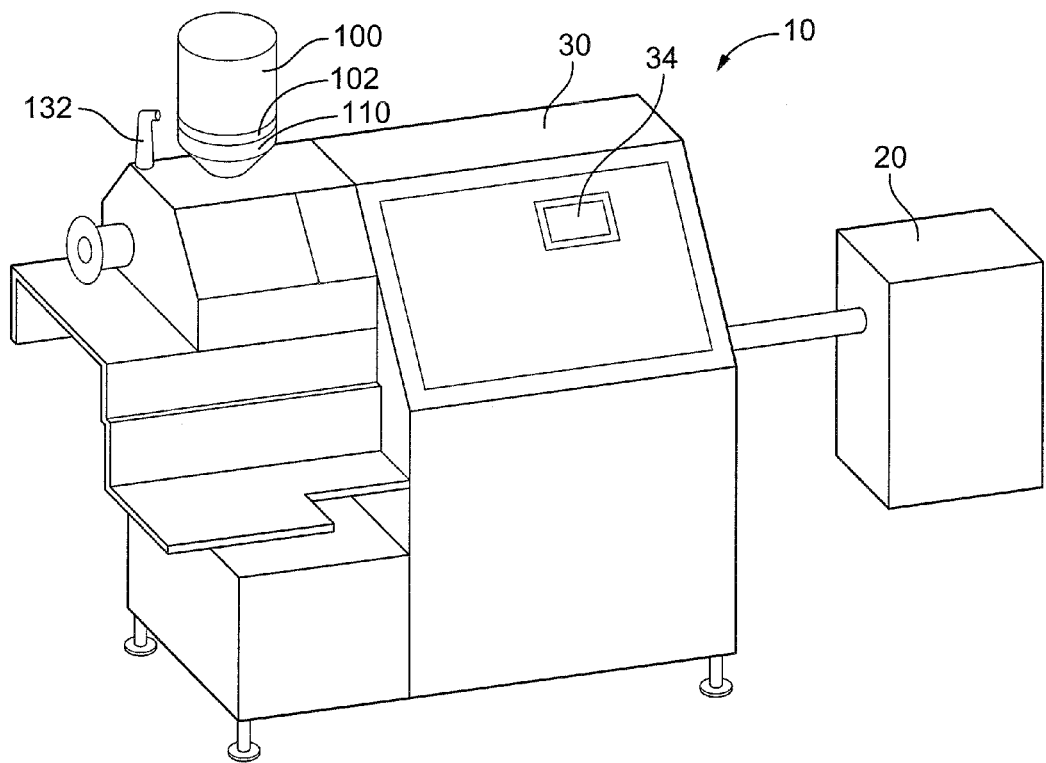
FIG. 3 is a front elevation view of another embodiment of the clip control system of the present invention.
Figure 4:
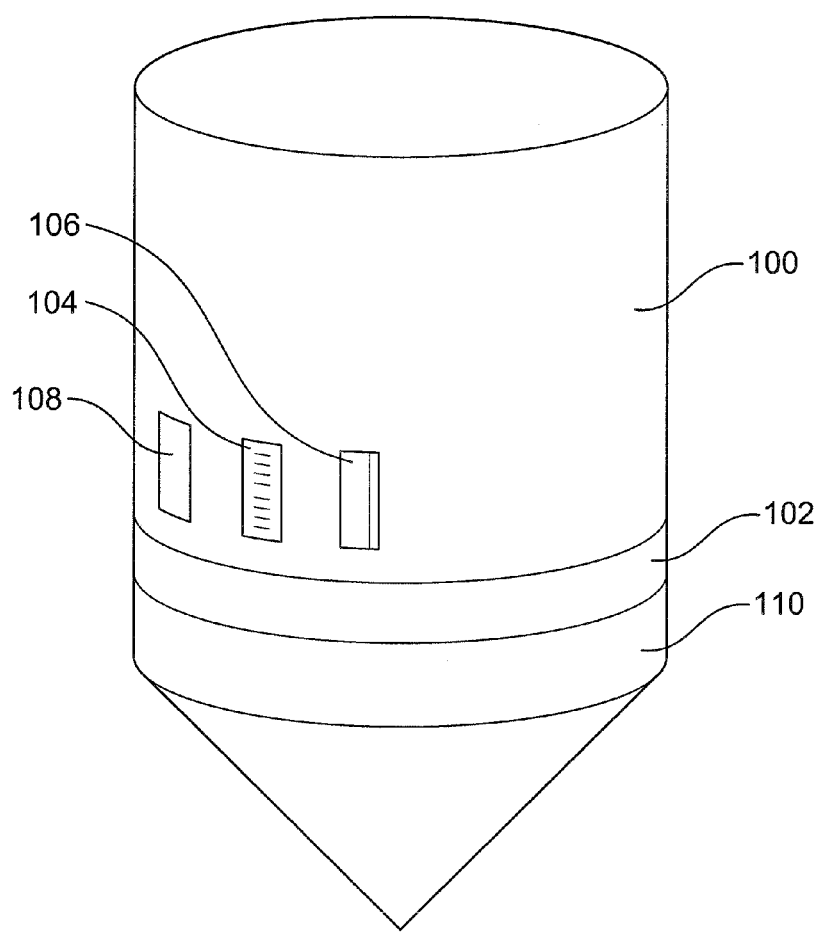
FIG. 4 is a view of the canister, seal, and vibrator of the clip control system of FIG. 3.

In another embodiment, shown in FIG. 3, clips 40 are manufactured in a conventional way. Instead of being formed in a line, by being glued or taped together, however, clips 40 are supplied loose in a canister 100. Canister 100 is supplied with a seal 102 to keep clips 40 secured within canister 100. The manufacturer of clips 40 encodes information on canister 100 in one of a bar code 104, a magnetic strip 106, or a radio-frequency identification tag 108, in the manner described above. All three modes are shown in the sample canister 100 illustrated in FIG. 4, but it should be understood that only one mode is necessary. Please note that bar code 104, magnetic strip 106, and RFID tag 108 are illustrated as located on a side of canister 100, but can be situated on the top or bottom of canister 100 as well.

Stuffer/clipper 30 is preferably a conventional stuffer/clipper, such as a TSC-N automatic stuffer/clipper sold by Poly-clip System Corp. of Mundelein, Ill., except as modified herein. Stuffer/clipper 30 has a vibrator 110 mounted thereto. Vibrator 110 is a conventional vibrator, of a type used in the conventional manufacture of clips, to align clips 40 in a row. When loose clips 40 are transferred from canister 100 to vibrator 110, vibrator 110 forms the loose clips 40 into an aligned row on a rail and feeds the aligned clips 40 to the clip rail of stuffer/clipper 30, which thereafter uses clips 40 in a conventional way as described above.

Canister 100 mounts to vibrator 110 by structure such as tongue and groove, screw thread, bolts, bayonet connectors, or other similar devices, to hold canister 100 securely to vibrator 110. A reader 132 is coupled to stuffer/clipper 30 and is one of a bar code reader, a magnetic strip reader, and an RFID reader, as described above. When a user mounts canister 100 to vibrator 110, reader 132 reads the information encoded on canister 100 in the manner described above, whether than information is encoded into bar code 104, magnetic strip 106, or RFID tag 108. Reader 132 conveys the information to the central processing unit 34 of stuffer/clipper 30, which then self-adjusts for the type of clip 40 being loaded. Stuffer/clipper 30 will adjust its operating parameters for the specific clip 40, without any further action by the operator of the apparatus. In this manner, mistakes in the setting of operating parameters can be minimized, as the operator does not directly enter the parameters.

Mistakes resulting from using the wrong clips can also be avoided using one of the embodiments of the present invention. In this embodiment, an operating parameter of stuffer/clipper 30 is whether the proper clips are being used. Stuffer/clipper 30 is programmed to proceed with stuffing and clipping only if the proper type of clips is supplied for the type of sausage being made, and to reject canister 100 if the encoded information reveals that the wrong type of clips 40 is supplied for the type of sausage being made. Accordingly, stuffer/clipper 30 will not break seal 102, allowing loose clips 40 to fall into vibrator 110, unless canister 100 contains the proper clips 40 for the type of sausage being made. Similarly, stuffer/clipper 30 is programmed to proceed with stuffing and clipping only if the proper type of clips is supplied for the type of sausage being made, and to reject reel 50 if the encoded information reveals that the wrong type of clips 40 is supplied for the type of sausage being made, and will not proceed further until a reel 50 containing the proper clips 40 is mounted and recognized. Accordingly, the operator will know immediately if the wrong clips 40 have been mounted, as stuffer/clipper 30 will not proceed further. The operator can then locate and mount a canister 100 containing the correct clips 40 for the job so that the sausage is manufactured properly.

In yet another embodiment, the manufacturer of clips 40 can encode information as to its own identity in bar code 70 or 104, RFID tag 60 or 108, or magnetic strip 80 or 106. Should there be a malfunction of clips 40, resulting in damaged machinery or lost product, the manufacturer will be able to tell, from consulting the memory of stuffer/clipper 30, if the allegedly defective clips 40 were indeed manufactured by that manufacturer or were supplied by someone else. The manufacturer can thereby guarantee performance of its own products and not be charged with malfunction of someone else's products.

While preferred embodiments of the present invention are shown and described, it is envisioned that those skilled in the art may devise various modifications of the present invention without departing from the spirit and scope of the appended claims.

We claim:

1. A clip control system comprising:
   a stuffer/clipper for processing a food product, said stuffer clipper comprising a reader and a processing unit and having a product-specific operating parameter, said operating parameter comprising at least one of a clip type, a portion per casing, a label, and a casing brake setting;
   a clip package mountable to said stuffer/clipper and holding a plurality of clips; and
   information encoded in said clip package and readable by said reader;
   said processing unit configured to receive said information and to set said operating parameter based thereon.

2. The clip control system of claim 1, wherein said clip package comprises one of a reel and a cannister.

3. The clip control system of claim 1, wherein said clip package comprises an RFID tag, said information is encoded in said RFID tag, and said reader is an RFID reader.

4. The clip control system of claim 1, wherein said clip package comprises a bar code, said information is encoded in said bar code, and said reader is a bar code reader.

5. The clip control system of claim 1, wherein said clip package comprises a magnetic strip, said information is encoded in said magnetic strip, and said reader is a magnetic reader.

6. The clip control system of claim 1, wherein said information is specific to a product made by said stuffer/clipper.

7. The clip control system of claim 6, wherein said processing unit further comprises programming to reject said clip package if said information does not match said product.

8. The clip control system of claim 1, wherein said information comprises an identity of a manufacturer of said clips.

* * * * *